United States Patent Office 3,144,455
Patented Aug. 11, 1964

3,144,455
MONO AND BIS N-PHENACYL QUATERNARY AMMONIUM SALTS OF TRIETHYLENEDI-AMINE
Robert B. Moffett, Kalamazoo, Mich., assignor to The Upjohn Company, Kalamazoo, Mich., a corporation of Delaware
No Drawing. Filed Dec. 20, 1963, Ser. No. 332,242
10 Claims. (Cl. 260—268)

This invention relates to mono and bis quaternary ammonium salts of triethylenediamine and to processes for their preparation and is more particularly concerned with the mono and bis N-phenacyl and N-(substituted-phenacyl) quaternary ammonium salts of triethylenediamine and with processes for their preparation.

The compounds of the invention can be represented by the following formulae:

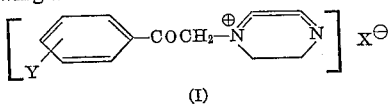

(I)

and

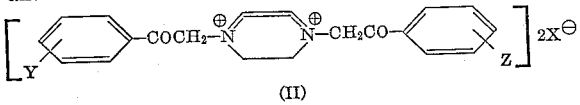

(II)

wherein Y and Z each represent at least one substituent selected from the class consisting of hydrogen, nitro, halogen, hydroxy, lower-alkoxy, and lower-alkyl, and X is the anion of a pharmacologically acceptable acid. The compounds of the invention also include the acid addition salts of the free bases of Formula I with pharmacologically acceptable acids, and the N-oxides of the compounds of Formula I and the acid addition salts of said N-oxides with pharmacologically acceptable acids.

The term "lower-alkyl" means an alkyl radical containing from 1 to 8 carbon atoms, inclusive, such as methyl, ethyl, propyl, butyl, pentyl, hexyl, heptyl, octyl, and isomeric forms thereof. The term "lower-alkoxy" means an alkoxy radical containing from 1 to 8 carbon atoms, inclusive, such as methoxy, ethoxy, propoxy, butoxy, pentyloxy, hexyloxy, heptyloxy, octyloxy, and isomeric forms thereof. The term "pharmacologically acceptable acids" is well recognized in the art and is inclusive of acids such as sulfuric, hydrochloric, hydrobromic, hydriodic, nitric, phosphoric, lactic, benzoic, methanesulfonic, p-toluenesulfonic, salicylic, acetic, propionic, maleic, malic, tartaric, citric, cyclohexylsulfamic, succinic, nicotinic, ascorbic acids and the like.

The novel compounds of the invention, i.e., the compounds of Formulae I and II above, the N-oxides of compounds of Formula I, and the acid addition salts of the compounds of Formula I and the N-oxides thereof with pharmacologically acceptable acids, possess pharmacological activity. Illustratively the compounds of the invention show antibacterial activity, ganglionic blocking activity, and central nervous system depressant activity. The antibacterial activity of the compounds of the invention renders them valuable for the control of bacterial organisms, both systemically and topically in mammals, and also for sterilization purposes, for example in the sterilization of surgical instruments and in related fields.

For purposes of administration to mammals, including animals of economic value, the novel compounds of the invention can be combined with solid and liquid pharmaceutical carriers and formulated in the form of tablets, powder packets, capsules and like solid dosage forms using starch and like excipients, or dissolved or suspended in suitable solvents or vehicles for oral or parenteral administration.

The novel compounds of the invention can be prepared conveniently by reacting triethylenediamine with the appropriate phenacyl halide

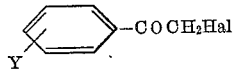

wherein Y is as hereinbefore defined and Hal represents a halogen atom, preferably bromine or chlorine. The reaction is carried out advantageously in the presence of an inert solvent, for example, an alkanone such as acetone, methyl ethyl ketone, methyl isopropyl ketone and the like, or an alkanol such as methanol, ethanol, butyl alcohol and the like. Where the required product is the mono quaternary ammonium salt of Formula I the triethylenediamine and the halide can be employed in approximately stoichiometric quantities, i.e., equimolar quantities. It is preferred, however, to employ the triethylenediamine in excess, for example, 100% excess. Where the required product is the bis quaternary ammonium salt of Formula II the quantities of reactants can be approximately stoichiometric, i.e., about 2 moles of the halide per mole of triethylenediamine. It is preferred, however, to employ the halide in excess, for example, 50% excess.

The reaction is generally conducted at a temperature of the order of 20 to 30° C., although higher or lower temperatures can be employed if desired. Generally speaking the required product separates from solution and is isolated by filtration. If desired the compound so obtained can be purified by conventional procedures, for example by recrystallization.

Unsymmetrical quaternary compounds of Formula II, i.e., compounds in which the substituents Y and Z in compounds (II) are different, can be prepared by reacting a mono quaternary compound (I) with a phenacyl halide,

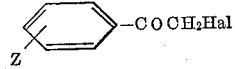

(wherein Z and Hal are as hereinbefore defined) in which the substituent Z differs from the substituent Y in the mono quaternary compound starting material.

The anion of the quaternary ammonium salts obtained as described above can be exchanged for any other desired anion, for example the anions of other pharmacologically acceptable acids, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

The acid additions salts of the compounds of Formula I above can be prepared by reacting the compound of Formula I with a pharmacologically acceptable acid in the presence of an inert solvent such as water, ether, and lower alkanols such as methanol, ethanol and the like.

The N-oxide compounds of the invention can be prepared by methods well known in the art, for example, by reacting the free base of the Formula I with an oxidizing agent such as hydrogen peroxide, peracetic acid, Caro's acid, and the like. Advantageously, the reaction is carried out at ordinary temperatures (e.g., of the order of 20 to 30° C.) in the presence of an inert solvent such as benzene, chloroform, lower-alkyl alkanoates such as ethyl acetate, and lower alkanols such as methanol, ethanol, isopropyl alcohol, and the like. Suitably the oxidizing agent is employed in at least stoichiometric proportion with respect to the free base (I) and preferably the oxidizing agent is present in a slight excess. When the reaction has been completed, any excess of oxidizing agent can be removed by treating the reaction mixture with an agent such as platinum, palladium, Raney nickel, and inorganic hydrosulfites, such as sodium hydrosulfite, and the like.

The N-oxides of the invention can also be prepared by reacting the mono-N-oxide of triethylenediamine with an approximately equimolar proportion of the appropriate phenacyl halide

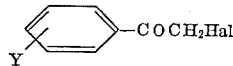

wherein Y and Hal have the significance hereinbefore defined, using the conditions described above for preparation of the quaternary ammonium salts of the invention.

The N-oxide acid addition salts of the invention can be prepared from the corresponding N-oxide and a pharmacologically acceptable acid using the procedures hereinbefore described for the preparation of the acid addition salts of the compounds (I).

The phenacyl halides

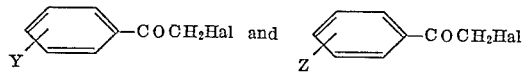

wherein Y, Z, and Hal are as hereinbefore defined, are for the most part known in the art or can be prepared by conventional procedures, for example, by direct halogenation of the appropriately substituted acetophenone, or by treatment of the appropriately substituted benzene with a haloacetyl halide in the presence of aluminum chloride.

For the sake of simplicity the well-known trivial name triethylenediamine is employed herein. For indexing purposes Chemical Abstracts employs the systematic name 1,4 - diazabicyclo[2.2.2]octane for this diamine. The system of nomenclature used in naming the novel quaternary ammonium compounds of this invention is consistent with Chemical Abstracts practice.

The following examples illustrate the best method contemplated by the inventor for carrying out his invention.

*Example 1.—1-Phenacyl-4-Aza-1-Azoniabicyclo [2.2.2]Octane Bromide*

To a solution of 44.8 g. (0.4 mole) of triethylenediamine in 400 ml. of methyl ethyl ketone was added slowly with stirring during 2.5 hrs. a solution of 39.8 g. (0.2 mole) of 2-bromoacetophenone in 250 ml. of methyl ethyl ketone. The mixture was stirred for 1.5 hrs. after the addition was completed. The white precipitate which separated was isolated by filtration, washed with methyl ethyl ketone and dried. There was thus obtained 64.2 g. of 1 - phenacyl - 4-aza-1-azoniabicyclo[2.2.2]octane bromide having a melting point of 272° C. (decomposition; darkening from 240° C.). This product was recrystallized from 300 ml. of methanol, giving 42 g. of a white crystalline solid having a melting point of 273° C. (decomposition; darkening from 240° C.).

*Analysis.*—Calcd. for $C_{14}H_{19}BrN_2O$: C, 54.03; H, 6.15; N, 9.00; Br, 25.68. Found: C, 54.21; H, 5.86; N, 8.77; Br, 25.62.

*Example 2.—1,4-Diphenacyl-1,4-Diazoniabicyclo [2.2.2]Octane Dibromide*

To a solution of 11.2 g. (0.1 mole) of triethylenediamine in 50 ml. of methanol was added 60.0 g. (0.3 mole) of 2 - bromoacetophenone. The temperature reached reflux and then subsided. The mixture was allowed to stand for 2.5 days and the solid which had separated was isolated by filtration, washed with methanol and dried. There was thus obtained 48.9 g. of 1,4-diphenacyl-1,4-diazoniabicyclo[2.2.2]octane dibromide in the form of a hydrate having a melting point of 283° C. (decomposition; darkening from 242° C.). This product was recrystallized from 50% methanol to give 37.9 g. of white crystalline material with the same melting characteristics.

*Analysis.*—Calcd. for $C_{22}H_{26}Br_2N_2O_2 \cdot \frac{1}{4}H_2O$: C, 51.33; H, 5.19; N, 5.44; Br, 31.05. Found: C, 51.61; H, 5.13; N, 5.32; Br, 31.04.

*Example 3.—1-(p-Nitrophenacyl)-4-Aza-1-Azoniabicyclo [2.2.2]Octane Bromide*

To a solution of 44.8 g. (0.4 mole) of triethylenediamine in 70 ml. of methanol and 270 ml. of methyl ethyl ketone was added slowly with stirring a hot solution of 48.8 g. (0.2 mole) of p-nitrophenacyl bromide in 250 ml. of methyl ethyl ketone. The resulting mixture was stirred for a further 5.5 hr. and the solid which had separated was isolated by filtration and dried. There was thus obtained 57.5 g. of 1-(p-nitrophenacyl)-4-aza-1-azoniabicyclo[2.2.2]octane bromide in the form of a crystalline solid having a melting point of 190° C. (decomposition; darkening from 174° C.). This product was recrystallized from methanol to give 42.5 g. of yellow crystalline material having a melting point of 187° C. (decomposition; darkening from 170° C.). A second crop of 10.5 g. was obtained from the mother liquor.

*Example 4.—1-(p-Nitrophenacyl)-4-Aza-1-Azoniabicyclo [2.2.2]Octane Bromide Hydrobromide*

A solution of 52.6 g. (0.148 mole) of 1-(p-nitrophenacyl)-4-aza-1-azoniabicyclo[2.2.2]octane bromide in 550 ml. of methanol was acidified with 40 ml. of 48% aqueous hydrobromic acid. The mixture was heated to boiling and just sufficient water was added to dissolve the solid. The mixture was cooled and the solid which separated was isolated by filtration, washed with methanol, and dried. There was thus obtained 55.8 g. of 1-(p-nitrophenacyl) - 4-aza-1-azoniabicyclo[2.2.2]octane bromide hydrobromide in the form of a hemihydrate having a melting point greater than 300° C. (darkening from 232° C.).

*Analysis.*—Calcd. for $C_{14}H_{19}Br_2N_3O_3 \cdot \frac{1}{2}H_2O$: C, 37.69; H, 4.52; N, 9.42; Br, 35.82. Found: C, 37.82; H, 4.70; N, 9.23; Br, 35.20.

*Example 5.—1,4-Di(p-Nitrophenacyl)1,4-Diazoniabicyclo[2.2.2]Octane Dibromide*

A solution of 11.2 g. (0.1 mole) of triethylenediamine in 70 ml. of methanol was added slowly at 50 to 55° C. with stirring to a solution of 73.2 g. (0.3 mole) of p-nitrophenacyl bromide in 500 ml. of methyl ethyl ketone. The resulting mixture was stirred overnight at 50 to 55° C. and was then cooled. The solid which had separated was isolated by filtration, washed with methanol, and dried. There was thus obtained 58.4 g. of 1,4-di(p-nitrophenacyl) - 1,4-diazoniabicyclo[2.2.2]octane dibromide having a melting point of 300° C. (darkening from 230° C.). This material was recrystallized from about 4 l. of water to give 49.3 g. of crystalline material having a melting point greater than 300° C. (darkening from 235° C.).

*Analysis.*—Calcd. for $C_{22}H_{24}Br_2N_4O_6$: C, 44.02; H, 4.03; N, 9.33; Br, 26.63. Found: C, 43.74; H, 3.75; N, 9.31; Br, 26.24.

*Example 6.—1-(3,4-Dihydroxyphenacyl)4-Aza-1-Azoniabicyclo[2.2.2]Octane Chloride*

To a solution of 56.0 g. (0.5 mole) of triethylenediamine in 500 ml. of methyl ethyl ketone was added slowly with stirring during 1 hr. a solution of 37.2 g. (0.2 mole) of 3,4-dihydroxyphenacyl chloride in 450 ml. of methyl ethyl ketone. The resulting mixture was stirred for a further 5 hrs. The solid which had separated was isolated by filtration, washed with ether, and dried. There was thus obtained 27.9 g. of 1-(3,4-dihydroxyphenacyl)-4-aza-1-azoniabicyclo[2.2.2]octane chloride in the form of a light green solid having a melting point of 266° C. (decomposition). This product was recrystallized from 350 ml. of 80% methanol to yield 12.12 g. of crystalline material having a melting point of 268° C. (decomposition). An analytical sample was dried for 4 hrs. at 50° C. under a pressure of 30 mm. of mercury.

*Analysis.*—Calcd. for $C_{14}H_{19}ClN_2O_3$: C. 56.28; H, 6.41; N, 9.38; Cl, 11.87. Found: C, 56.04; H, 6.21; N, 9.16; Cl, 11.40.

*Example 7.—1,4-Di(3,4-Dihydroxyphenacyl)-1,4-Diazoniabicyclo[2.2.2]octane Dichloride*

A solution of 11.2 g. (0.1 mole) of triethylenediamine in 50 ml. of methanol was added slowly to a warm solution of 46.5 g. (0.25 mole) of 3,4-dihydroxyphenacyl chloride in 250 ml. of methanol. The resulting mixture was stirred for 2 hr. and then allowed to stand for 2.5 days. The black solid which had separated was removed by filtration and discarded. The filtrate was treated with decolorizing charcoal and then filtered and the filtrate was evaporated to dryness. The residue was recrystallized once from 50% isopropyl alcohol and then twice from water. There was thus obtained 4.3 g. of 1,4-di(3,4-dihydroxyphenacyl)-1,4-diazoniabicyclo[2.2.2]octane dichloride in the form of a monohydrate having a melting point of 260° C. (decomposition).

*Analysis.*—Calcd. for $C_{22}H_{26}Cl_2N_2O_6 \cdot H_2O$: C. 52.49; H, 5.61; N, 5.57; H, 14.09. Found: C, 52.09; H, 5.25; N, 5.34; Cl, 13.99.

*Example 8.—1-(4-Bromophenacyl)-4-aza-1-azoniabicyclo[2.2.2]octane Bromide*

Using the procedure described in Example 1, but replacing 2-bromoacetophenone by 2,4'-dibromoacetophenone, there can be obtained 1-(4-bromophenacyl)-4-aza-1-azoniabicyclo[2.2.2]octane bromide in the form of a crystalline solid.

Similarly, using the procedure of Example 1, but replacing 2-bromoacetophenone by 2,3'-dibromoacetophenone, 2-bromo-4'-methylacetophenone, 2-bromo-4'-ethylacetophenone, 2,2',4'-tribromoacetophenone, 2-bromo-4'-methoxyacetophenone, 2-bromo-3'-methyl-6'-methoxyacetophenone, 2-bromo-3',4'-dimethoxyacetopheone, 2-bromo-4'-ethoxyacetophenone, 2-bromo-2'-methoxy-5'-chloroacetophenone, and 2-bromo-2',4'-dichloroacetophenone, there can be obtained 1-(3-bromophenacyl)-,
1-(4-methylphenacyl)-,
1-(4-ethylphenacyl)-,
1-(2,4-dibromophenacyl)-,
1-(4-methoxyphenacyl)-,
1-(3-methyl-6-methoxyphenacyl)-,
1-(3,4-dimethoxyphenacyl)-,
1-(4-ethoxyphenacyl)-,
1-(2-methoxy-5-chlorophenacyl)-, and
1-(2,4-dichlorophenacyl)-4-aza - 1 - azoniabicyclo[2.2.2]octane bromides, respectively.

*Example 9.—1,4-Di(4-Bromophenacyl)-1,4-Diazoniabicyclo[2.2.2]octane Dibromide*

Using the procedure described in Example 2, but replacing 2-bromoacetophenone by 2,4'-dibromoacetophenone, there can be obtained 1,4-di(4-bromophenacyl)-1,-4-diazoniabicyclo[2.2.2]octane dibromide.

Similarly, using the procedure of Example 2, but replacing 2-bromoacetophenone by 2,3'-dibromoacetophenone, 2-bromo-4'-methylacetophenone, 2-bromo-4'-ethylacetophenone, 2,2',4'-tribromoacetophenone, 2-bromo-4'-methoxyacetophenone, 2-bromo-3'-methyl-6'-methoxyacetophenone, 2-bromo-3',4'-dimethoxyacetophenone, 2-bromo-4'-ethoxyacetophenone, 2-bromo-2'-methoxy-5'-chloroacetophenone, and 2-bromo-2',4'-dichloroacetophenone, there can be obtained 1,4-di(3-bromophenacyl)-,
1,4-di(4-methylphenacyl)-,
1,4-di(4-ethylphenacyl),
1,4-di(2,4-dibromophenacyl)-,
1,4-di(4-methoxyphenacyl)-,
1,4-di(3-methyl-6-methoxyphenacyl)-,
1,4-di(3,4-dimethoxyphenacyl)-,
1,4-di(4-ethoxyphenacyl)-,
1,4-di(2-methoxy-5-chlorophenacyl)-, and
1,4 - di(2,4-dichlorophenacyl)-1,4-diazoniabicyclo[2.2.2]octane dibromides, respectively.

*Example 10.—1-Phenacyl-4-(4-Bromophenacyl)-1,4-Diazoniabicyclo[2.2.2]octane Dibromide*

Using the procedure of Example 2, but replacing triethylenediamine by 1-(4-bromophenacyl)-4-aza-1-azoniabicyclo[2.2.2]octane bromide, there can be obtained 1-phenacyl - 4 - (4 - bromophenacyl) - 1,4 - diazoniabicyclo [2.2.2]octane dibromide.

Similarly, other unsymmetrical bis quaternary ammonium salts of the invention can be obtained by reacting the appropriate mono quaternary ammonium salt with the appropriate phenacyl halide.

*Example 11.—1,4-Diphenacyl-1,4-Diazoniabicyclo [2.2.2]octane Dichloride*

This compound can be prepared as follows: A solution of 1,4-diphenacyl-1,4-diazoniabicyclo[2.2.2]octane dibromide in water is shaken with a suspension of silver oxide until the precipitation of silver bromide is complete. The resulting mixture is filtered and the filtrate containing the corresponding quaternary ammonium hydroxide is neutralized by the addition of aqueous hydrochloric acid. By evaporating the resulting mixture to dryness, 1,4 - diphenacyl-1,4-diazoniabicyclo[2.2.2]octane dichloride can be obtained.

Similarly, using the above procedure, but replacing hydrochloric acid by other acids such as hydriodic, sulfuric. phosphoric, acetic, methanesulfonic and the like acids, there can be obtained the corresponding quaternary ammonium salts.

In like manner, using the above procedure, the anion of any of the mono or bis quaternary ammonium salts of the invention can be exchanged by any other desired anion by forming the corresponding quaternary ammonium hydroxide and reacting the latter with the appropriate acid. When a mono quaternary ammonium salt is employed as starting material in the above procedure, excess acid can be used in the neutralization to give the desired mono quaternary ammonium salt in the form of the corresponding acid addition salt.

*Example 12.—1-Phenacyl-4-aza-1-azoniabicyclo [2.2.2] octane N-Oxide Bromide*

This compound can be prepared as follows: To a solution of 1 g. of 1-phenacyl-4-aza-1-azoniabicyclo[2.2.2] octane bromide in 50 ml. of absolute ethanol is added an equimolar quantity of 30% hydrogen peroxide. The mixture is allowed to stand for 4 days at room temperature, at the end of which time the mixture is shaken with 0.5 g. of finely divided platinum until a test for peroxide is negative. The mixture is then filtered and the filtrate is evaporated to dryness under reduced pressure. There can thus be obtained 1-phenacyl-4-aza-1-azoniabicyclo [2.2.2]octane N-oxide bromide.

The N-oxide so obtained can be converted to its hydrobromide by using the procedure described in Example 4.

Similarly, using the procedure of Example 12, other mono quaternary ammonium salts of the invention can be converted to the corresponding N-oxides and N-oxide acid addition salts.

*Example 13.—1-Phenacyl-4-Aza-1-Azoniabicycle [2.2.2]Octane N-Oxide Bromide*

To a solution of 22.4 g. (0.2 mole) of triethylenediamine in 400 ml. of absolute ethanol was added, during 15 minutes with stirring at 20° C., 100 ml. of 30% aqueous hydrogen peroxide. The resulting mixture was allowed to stand for 4 days at room temperature and the excess hydrogen peroxide was then decomposed by the addition of an aqueous slurry of 0.5 g. of 30% platinum on charcoal. The mixture so obtained was stirred vigorously for 4 hr. before being filtered through a filter aid. The filtrate (ethanolic solution of triethylenediamine mono-N-oxide) was cooled to 3° C. and a solution of 41 g. (0.21 mole) of 2-bromoacetophenone in 100 ml. of ethanol was added. The resulting mixture was allowed to stand overnight and was then concentrated to 500 ml. The solid which separated was isolated by filtration, boiled with methanol and then cooled. The insoluble material was removed by filtration and the filtrate was combined with the filtrate from the reaction mixture. The combined filtrates were diluted with ether and the solid which separated was isolated by filtration and dissolved in 1.1 liters of 90% ethanol by warming. After filtration, the latter solution was diluted with 2 l. of absolute ether and the solid which separated was isolated by filtration. There was thus obtained 54.2 g. of 1-phenacyl-4-aza-1-azoniabicyclo[2.2.2]octane N-oxide bromide in the form of a monohydrate having a melting point of 165 to 166° C. (decomposition; darkening from 145° C.).

*Analysis.*—Calcd. for $C_{14}H_{19}BrN_2O_2 \cdot H_2O$: C, 48.70; H, 6.13; N, 8.12; Br, 23.15. Found: C, 48.92; H, 6.02; N, 7.82; Br, 23.25.

Similarly, using the above procedure, but replacing 2-bromoacetophenone by the appropriately substituted phenacyl halide there can be obtained other N-oxides of the invention.

I claim:

1. A compound selected from the class consisting of (a) mono and bis quaternary ammonium salts of triethylenediamine having the formulae:

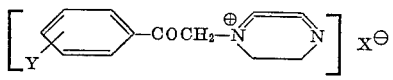

and

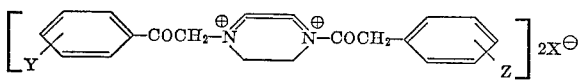

wherein X is the anion of a pharmacologically acceptable acid and Y and Z each represent at least one substituent selected from the class consisting of hydrogen, nitro, halogen, hydroxy, lower-alkoxy and lower-alkyl, and (b) the acid addition salts of the above mono quaternary ammonium salts with pharmacologically acceptable acids.

2. 1 - phenacyl-4-aza-1-azoniabicyclo[2.2.2]octane bromide.

3. 1,4 - diphenacyl-1,4-diazoniabicyclo[2.2.2]octane dibromide.

4. 1 - (p-nitrophenacyl)-4-aza-1-azoniabicyclo[2.2.2]-octane bromide.

5. 1 - (p-nitrophenacyl)-4-aza-1-azoniabicyclo[2.2.2]-octane bromide hydrobromide.

6. 1,4 - di(p - nitrophenacyl) - 1,4 - diazoniabicyclo-[2.2.2]octane dibromide.

7. 1 - (3,4 - dihydroxyphenacyl) - 4 -aza - 1 - azoniabicyclo[2.2.2]octane chloride.

8. 1,4 - di(3,4 - dihydroxyphenacyl) - 1,4 - diazoniabicyclo[2.2.2]octane dichloride.

9. A compound selected from the class consisting of (a) N-oxides having the formula:

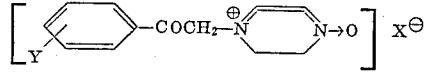

wherein X is the anion of a pharmacologically acceptable acid and Y represents at least one substituent selected from the class consisting of hydrogen, nitro, halogen, hydroxy, lower-alkoxy, and lower-alkyl, and (b) the acid addition salts of the N-oxides of the above formula with pharmacologically acceptable acids.

10. 1-phenacyl- 4 - aza - 1 - azoniabicyclo[2.2.2]octane N-oxide bromide.

References Cited in the file of this patent

Oae et al.: Journal Organic Chemistry, vol. 24, pp. 1348–1349 (1959).